Sept. 29, 1931. W. G. PRICE Re. 18,217
HYDRAULIC AND BAND BRAKE OPERATING MEANS
Original Filed Dec. 18, 1926
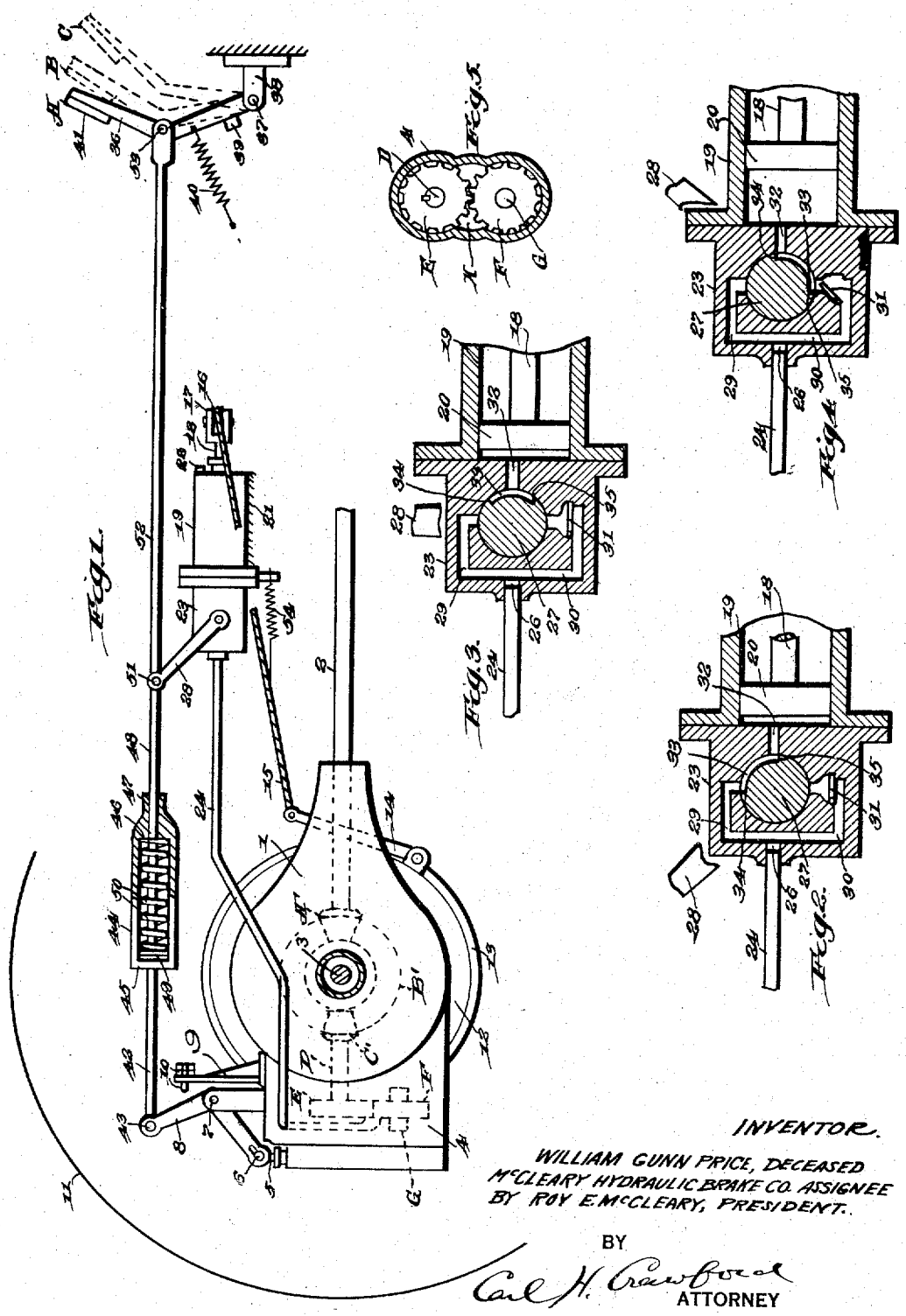
INVENTOR.
WILLIAM GUNN PRICE, DECEASED
McCLEARY HYDRAULIC BRAKE CO. ASSIGNEE
BY ROY E. McCLEARY, PRESIDENT.
BY
Carl H. Crawford
ATTORNEY Reissued Sept. 29, 1931 Re. 18,217

UNITED STATES PATENT OFFICE

WILLIAM GUNN PRICE, DECEASED, BY McCLEARY HYDRAULIC BRAKE CO., OF SEATTLE, WASHINGTON, ASSIGNEE

HYDRAULIC AND BAND BRAKE OPERATING MEANS

Original No. 1,694,020, dated December 4, 1928, Serial No. 155,725, filed December 18, 1926. Application for reissue filed April 7, 1930. Serial No. 442,433.

This invention relates to improvements in combined hydraulic and band brake operating mechanism and is an improvement on the invention set forth in the pending application filed July 8, 1926, Serial No. 121,187.

One of the objects of the present invention is to provide a hydraulic and band brake operating mechanism, including a foot treadle, preferably, wherein the treadle normally occupies a starting position and is movable to an initial position to actuate the hydraulic brake, and to a final position to operate the band brake, the movement of the treadle being in one direction throughout its actuation cycle and only two operative positions being necessary.

It is a further feature of the invention to provide fluid or other pressure operated means for actuating the band brake, such means being actuated by pressure from the hydraulic brake, means being provided for checking retraction of such pressure while the treadle is in its final position.

It is also an object of the invention to provide mechanism for selectively operating the hydraulic and band brakes and whereby one of said brakes may be operated to the exclusion of the other.

In the most improved form of the invention the two types of brakes are operated consecutively.

The invention has many other objects and features which will be more fully described in connection with the accompanying drawings and which will be more particularly pointed out in and by the appended claims.

In the drawings:—

Fig. 1 is a view in side elevation, partly in section, showing one form of the invention applied to a motor vehicle.

Fig. 2 is a vertical sectional view of the band brake operating mechanism in the position which it would occupy when neither type of braking action is applied.

Fig. 3 shows the same parts in the position they would occupy when the hydraulic brake has been operated and before the band brake has been actuated.

Fig. 4 shows the same parts in the position they would occupy when both types of brakes have been set.

Fig. 5 is a sectional view of the gear portion of the hydraulic brake.

Like characters of reference designate similar parts throughout the different figures of the drawings.

There is briefly and generally shown a differential housing at 1, the drive shaft being indicated at 2 and one of the axle sections at 3. A hydraulic brake casing is shown at 4, having an operating valve stem 5 which is shown in a normal or non-operating position, and which is lifted when adjusted for operating the brake. There is shown a pinion A′, on shaft 2, meshing with a ring gear B′, and a pinion C′ meshes with gear B′ and is mounted on shaft D, which extends into the brake casing 4, and on which gear E, is suitably keyed, as shown in Fig. 5. An idle gear F, is mounted on shaft G. Gears E and F, are in mesh, and when the brake is in a service adjustment, they congest the oil in chamber H. The stem 5, has slotted connection at 6, with one arm of a bell crank lever pivoted at 7, the remaining arm 8, being connected with an operating mechanism which will be later described. A stop bracket 9, is shown mounted on the brake casing 4, and is provided with an adjustable stop 10, for limiting movement of arm 8, to a full opening position of stem 5.

There is indicated a rear wheel at 11, a band brake drum at 12, and a band brake at 13. The band brake is shown having an operating lever 14, the free end of which is connected with one end of an operating cable 15, the bight of which is trained over a pulley 16. It will be understood that while there is only shown one band brake, the remaining end of the cable 15, will be connected with the remaining lever 14, not shown.

Reference will next be made to the improved pressure operated means for actuating the band brake.

The sheave or pulley 16, is mounted in a fork 17, on a piston rod 18, that is slidable in a cylinder 19, the rod having a piston 20. The cylinder 19, may be supported in a fixed position in any desirable manner as indicated at 21. A vent 22, may be provided in the cylinder 19, to freely admit and discharge air from the right of piston 20, viewing Figs. 2 to 4. When the piston 20 is in the position shown in Figs. 1 and 2, the band brakes are not applied, but movement of said piston 20 to the position shown in Fig. 4, will apply band brakes. On the left hand end of cylinder 19, is a valve casing 23, which is provided with a pressure connection in the form of a pipe 24, with the pressure chamber H, of the hydraulic brake casing 4, the latter connection being indicated at 25, and the connection with casing 23 being indicated at 26. Said casing 23 is provided with a valve, which in this construction, is shown as an oscillatory or rotating valve 27, a valve operating arm 28, being suitably attached thereto. There is shown an egressing port 29, leading from connection 26, to an upper peripheral portion of valve 27, and an ingressing port 30, leading from connection 26, to a lower peripheral portion of valve 27.

A suitable non-return flap or device 31, is interposed in the ingressing port 30, to prevent retraction of the pressure medium backwardly from valve 27, to pipe 24, but freely permitting movement of such pressure medium toward valve 27. A cylinder port 32, leads off from one peripheral portion of valve 27, toward and into cylinder 19, and it will be seen that this port 32, is between the valve terminals of ports 29 and 30, and also, that the latter are in full communication with each other at their juncture with connection 26. Valve 27, is shown provided with a peripherally disposed and circumferentially extending connection port having termnials 34 and 35. The ports are so proportioned and disposed that when the valve 27, is in the position shown in Fig. 2, port 33 will connect port 29, with port 32, and when valve 27 is in the position shown in Fig. 3, port 33, will register exclusively with port 32. When the valve 27, is in the position shown in Fig. 4, port 33, will connect ports 32 and 30.

Reference will next be made to novel operating mechanism for actuating hydraulic and band brakes.

A treadle or foot lever is indicated at 36 and is pivotally mounted at 37, to a suitably fixed bracket 38. A stop 39 limits movement of the treadle 36 toward a starting or normal position indicated at A, and a spring 40, normally urges said treadle 36, toward a normal position. Said treadle 36, has a foot engaging end 41, against which the foot of the driver is adapted to be pressed. There is indicated an initial position of said lever at B, and a final position at C, the arrangement being such that the hydraulic brake will be actuated by movement of treadle 36 to the B-position, and when the treadle 36 is moved to the C-position, the band brakes will also be applied.

Thus, it will be seen that only two operative positions are necessary, and that while the treadle 36 is negotiating its operative cycle, it is being moved wholly in one direction, namely, to the right of Fig. 1. Means is provided for operatively connecting arm 8, arm 28 and treadle 36, and said means is preferably in the form of a jointed rod structure. One section 42, is connected at 43, with arm 8, at one end of said section, the remaining end terminating in a yoke comprising longitudinal members 44, an abutment 45, an abutment member 46, and a rod sleeve 47. A rod section 48, is slidable through said sleeve and has a spring abutment 49. An expansively acting spring 50, is interposed between abutments 46 and 49 and normally acts to hold the parts in the position shown. The remaining end of section 48, is pivoted to arm 28, at 51. A rod section 52, has one end pivoted to arm 28 at 51, and its other end is pivoted at 53, to the treadle 36.

The operation of the invention will next be described.

With the parts in the position shown in Fig. 1, neither type of brake is applied. Should the driver wish to make a normal or usual application of brakage he would advance treadle 36 from position A, to position B. The spring 50, is strong enough not to yield under such adjustment and the arm 8, would be advanced into contact with stop 10. Of course, in many instances, a lesser braking application would be applied in which event the arm 8, would not be moved into contact with stop 10. Thus, it will be seen that in this invention, the hydraulic brake is relied upon for the usual brakage functions. However, assuming that a full application of hydraulic brakage was applied and the arm 8, was moved into contact with stop 10, then arm 28 would be moved into the position shown in Fig. 3, with port 33 opening exclusively to port 32 and closing ingress and egress ports 30 and 29. Thus, no band brakage would be applied.

Now assume that the maximum hydraulic brakage was not sufficient and it was desired to apply band brakage, then, the treadle 36 would be moved from position B, to position C. This would compress spring 50 and permit of sections 48 and 52 moving to the right of Fig. 1, after stop 10 had arrested further movement of section 42. Such an adjustment, would move arm 28, from the Fig. 3, to the Fig. 4, position thereby registering port 33, with ports 31 and 32. Now it will be understood that at this time, the hydraulic brake is applied and consequently, a pressure of oil is available from the pressure chamber H, of said brake, and such pressure medium will flow through pipe 24 to the valve casing 23. As port 29 is closed, in the Fig. 4, adjustment, oil will flow through ingress port 30, past non-return valve 31, into port 33, and through port 32 to the cylinder 19, forcing piston 20, to the right of Fig. 4, as shown. This action, through cable 15, applies the band brakes. As long as treadle 36, is held in the C-position, and irrespective of any variation of pressure in the hydraulic brake, the band brakes will be locked in an applied adjustment for the reason that the non-return device 31, will not permit any retraction of the oil back toward pipe 24, from cylinder 19. This has obvious advantages under many conditions that need not be described.

However, the important fact to be noted is that the band brake can be locked in an applied position or adjustment wholly by trapping or preventing retraction of the pressure medium in the cylinder 19, at the left of piston 20, in the absence of any structural connections.

This may be done not only by the non-return device, but also by slightly moving the valve 27, in a contra-clockwise direction from Fig. 4, sufficiently to advance the terminal 35, of port 33, out of registry with port 30, after the piston 20, has been fully actuated by the pressure medium. Such movement of the valve 27, could be made by slightly releasing treadle 36, toward stop 39, sufficiently for such movement of valve 27, in which event, the valve itself, would function as a non-return means, which is considered novel.

It will be clear that if the hydraulic brake developed leakage past the gears and failed to operate efficiently at a slow rate of travel of the vehicle, reliance could be placed on the band brakes, and further, the band brakes function in an important capacity for locking the vehicle against starting down hill, by reason of the fact that hydraulic brakes do not become responsive until after the vehicle has started.

Assuming that it was desired to release band brakage, the treadle 36 would be released back to position A. This would relieve the pressure in the hydraulic brake, and the parts would be restored to the position shown in Fig. 1. Valve 27, would return to the position shown in Fig. 2. Thus the oil confined under pressure in cylinder 19, would instantly seek relief and pass out through ports 32, 33 and 29, and through pipe 24 back to the hydraulic brake. A spring 54, is provided to prevent the band brakes from dragging after being released.

While there is herein shown and described one specific form of the invention, it is not wished to be limited thereto except for such limitations as the claims may import.

What is claimed is:—

1. In combination, a motor vehicle having a hydraulic brake and a band brake, a piston for operating said band brake, a cylinder for said piston, a valve casing in said cylinder having a pressure connection with said hydraulic brake, a rotary valve in said casing adapted to occupy egress neutral and band brake positions, said casing having an egress port leading from said pressure connection to said valve, and an ingress port leading from said pressure connection to said valve, a non-return device interposed in said ingress port, said casing having a cylinder port leading from said valve to said cylinder, and said valve having a peripheral connection port for connecting said egress and cylinder ports when said valve is in an egress position, and registering said connection port exclusively with said cylinder port when said valve is in a neutral position, and connecting said cylinder port with said ingress port when said valve is in a band brake position, and mechanism connected with said hydraulic brake and valve for causing operation of said hydraulic brake and band brake.

2. In combination, a motor vehicle having a hydraulic brake and a band brake, pressure actuated means operated by said hydraulic brake for applying said band brake, a valve device for controlling admission of pressure to said means, a brake treadle, mechanism operatively connecting said treadle with said hydraulic brake and directly connected with said valve device to cause only hydraulic brakage when said treadle is moved to an initial position and to operatively actuate said valve device when said treadle is moved to a further position to effect band brakage, and means associated with said valve device for causing the pressure medium to retain band brakage while said treadle is held in such further position.

[L. S.] McCLEARY HYDRAULIC BRAKE CO.,
*Assignee of William Gunn Price, Deceased,*
By ROY E. McCLEARY,
*President.*